United States Patent [19]
Agrawal et al.

[11] Patent Number: 5,890,151
[45] Date of Patent: Mar. 30, 1999

[54] METHOD AND SYSTEM FOR PERFORMING PARTIAL-SUM QUERIES ON A DATA CUBE

[75] Inventors: Rakesh Agrawal, San Jose; Jehoshua Bruck, La Canada; Ching-Tien Ho, San Jose, all of Calif.

[73] Assignee: International Business Machines Corporation, Armonk, N.Y.

[21] Appl. No.: 853,750

[22] Filed: May 9, 1997

[51] Int. Cl.[6] .................................................. G06F 17/30
[52] U.S. Cl. .......................... 707/5; 707/1; 707/2; 707/3; 707/4; 707/6; 707/100; 707/200; 707/503; 707/504; 354/342; 364/282.1; 364/282.3
[58] Field of Search .................................. 707/5, 1, 2, 3, 707/4, 100, 200, 503, 504; 345/342; 364/282.1, 282.3

[56] References Cited

U.S. PATENT DOCUMENTS

| | | | |
|---|---|---|---|
| 5,257,365 | 10/1993 | Powers et al. | 395/600 |
| 5,359,724 | 10/1994 | Earle | 395/425 |
| 5,404,512 | 4/1995 | Powers et al. | 395/600 |
| 5,404,513 | 4/1995 | Powers et al. | 395/600 |
| 5,799,300 | 8/1998 | Agrawal et al. | 707/5 |
| 5,799,311 | 8/1998 | Agrawal et al. | 707/102 |

OTHER PUBLICATIONS

J. Srivastava et al., TBSAM: An access method for efficient processing of statistical queries. IEEE Transactions on Knowledge and Data Engineering, 1 (4), 1989.

P. M. Vaidya, Space–time tradeoffs for orthogonal range queries. In Proc. 17th Annual ACM Symp. on Theory of Comput., pp. 169–174, 1985.

A. Yao, On the complexity of maintaining partial sums. SIAM J. Computing, 14(2): 277–288, May 1985.

G. D. Cohen, et al., Covering radius 1985–1994. Appeared in Journal of Applicable Algebra in Engineering, Communication and Computing, special issue, 1996.

G. D. Cohen, et al. Further results on the covering radius of codes. IEEE Trans. Information Theory, IT–32(5):680–694, Sept. 1986.

R. L. Graham et al., On the covering radius of codes. IEEE Trans. Information Theory, IT–31(3):385–401, May 1985.

C. T. Ho et al., Range Queries in OLAP Data Cubes, IBM Research Report, To be presented at 1997 ACM SIGMOD Internation Conference on Management of Data, May 13, 1997–May 15, 1997 at Tucson, Az.

B. Chazelle et al., Computing partial sums in multidimensional arrays. In Proc. of the ACM Symp. on Computational Geometry, pp. 131–139, 1989.

S. Chaudhuri et al., Including group–by in query optimization. In Proc. of the 20th Int'l Conference on Very Large Databases, pp. 354–366, Santiago, Chile, Sep. 1994.

(List continued on next page.)

*Primary Examiner*—Thomas G. Black
*Assistant Examiner*—Jean M. Corrielus
*Attorney, Agent, or Firm*—Khanh Q. Tran

[57] ABSTRACT

Disclosed is a method and system for performing a partial-sum query in a database in which the data is represented as a multi-dimensional data cube. The data cube is partitioned into multi-dimensional blocks. One or more covering codes are then selected for each block, and a group of partial-sums is computed for each block based on its covering codes. At query time, the query result is generated by combining the partial-sums for those blocks that intersect with the query subset. To improve the query response time and reduce system storage requirements, the covering codes are preferably augmented as single-weight extended covering codes or composition-extended covering codes. Also, a second partial-sum may also be computed for each block to efficiently find its partial sum, based on the block's first partial-sums and the bit-position differences between selected codewords for the block and bit strings representing the cell indexes of the blocks intersecting with the query subset.

42 Claims, 6 Drawing Sheets

OTHER PUBLICATIONS

J. Gray et al., Data Cube: A relational aggregation operator generalizing group–by cross–tabs and sub–totals. In Proc. of the 12th Int'l Conference on Data Engineering, pp. 152–159, 1996. (also published as a Microsoft Technical Report, as submitted herewith.

A. Gupta et al., Aggregate–Query Processing in Data Warehousing Environments, Proceedings of the 21st VLDB Conf. Zurich, Switzerland, 1995, pp. 358–369.

V. Harinarayan et al., Implementing data cubes efficiently. In Proc. of the ACM SIGMOD Conference on Management of Data, Jun. 1996.

S. Agarwal et al., On the computation of Multidimentional Aggregates. In Proc. of the 22nd Int'l Conference on Very Large Databases, pp. 506–521, Mumbai (Bombay), India, Sep. 1996.

E. F. Codd, Providing OLAP (on–line Analytical Processing) to user Analysis: An IT mandate. Technical report, E.F. Codd and Associates, 1993.

A. Shukla et al., Storage estimation for multidimensional aggregates in the presence of hierarchies. In Proc. of the 22nd Int'l Conference on Very Large Databases, pp. 522–531, Mumbai (Bombay), India, Sep. 1996.

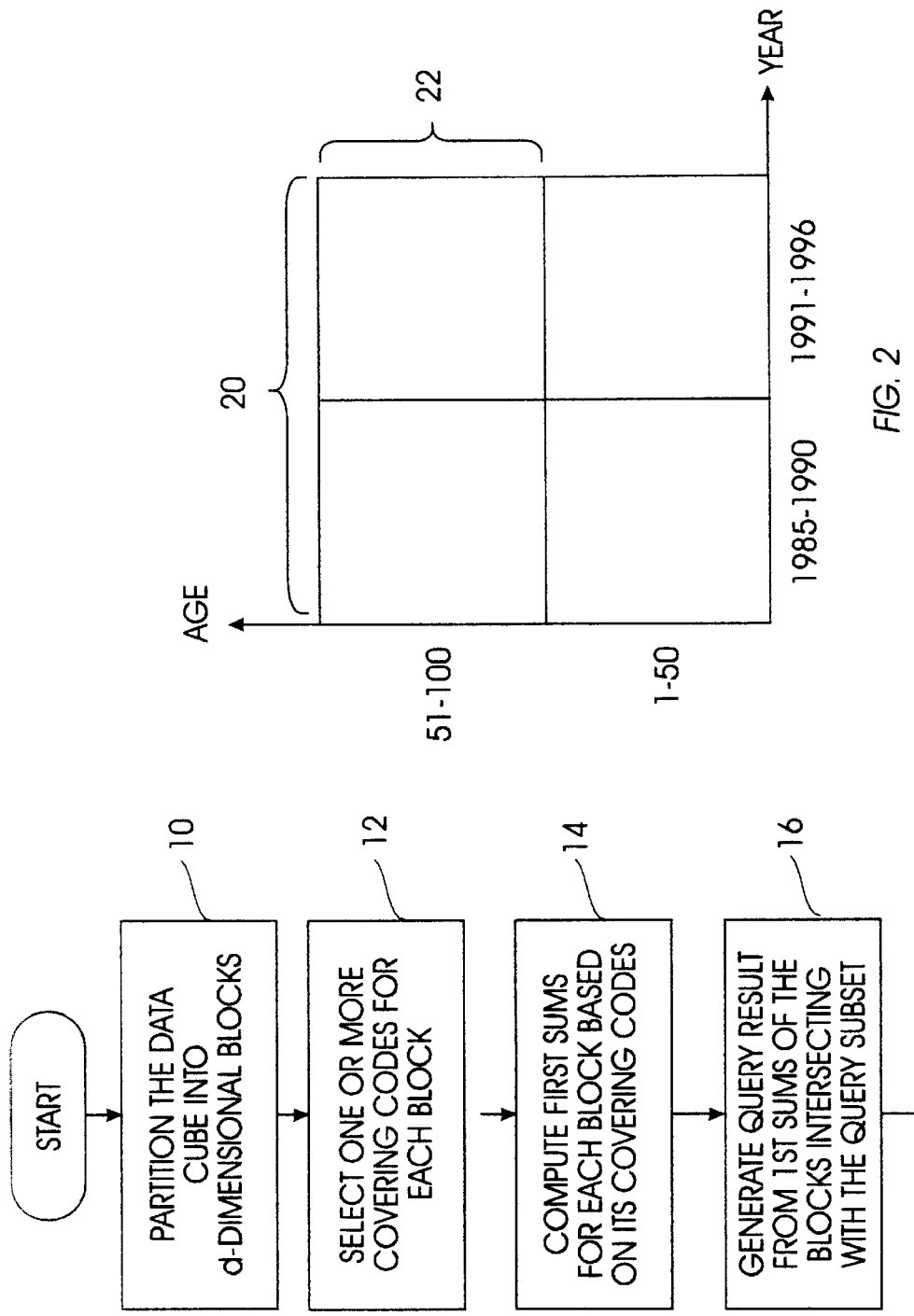

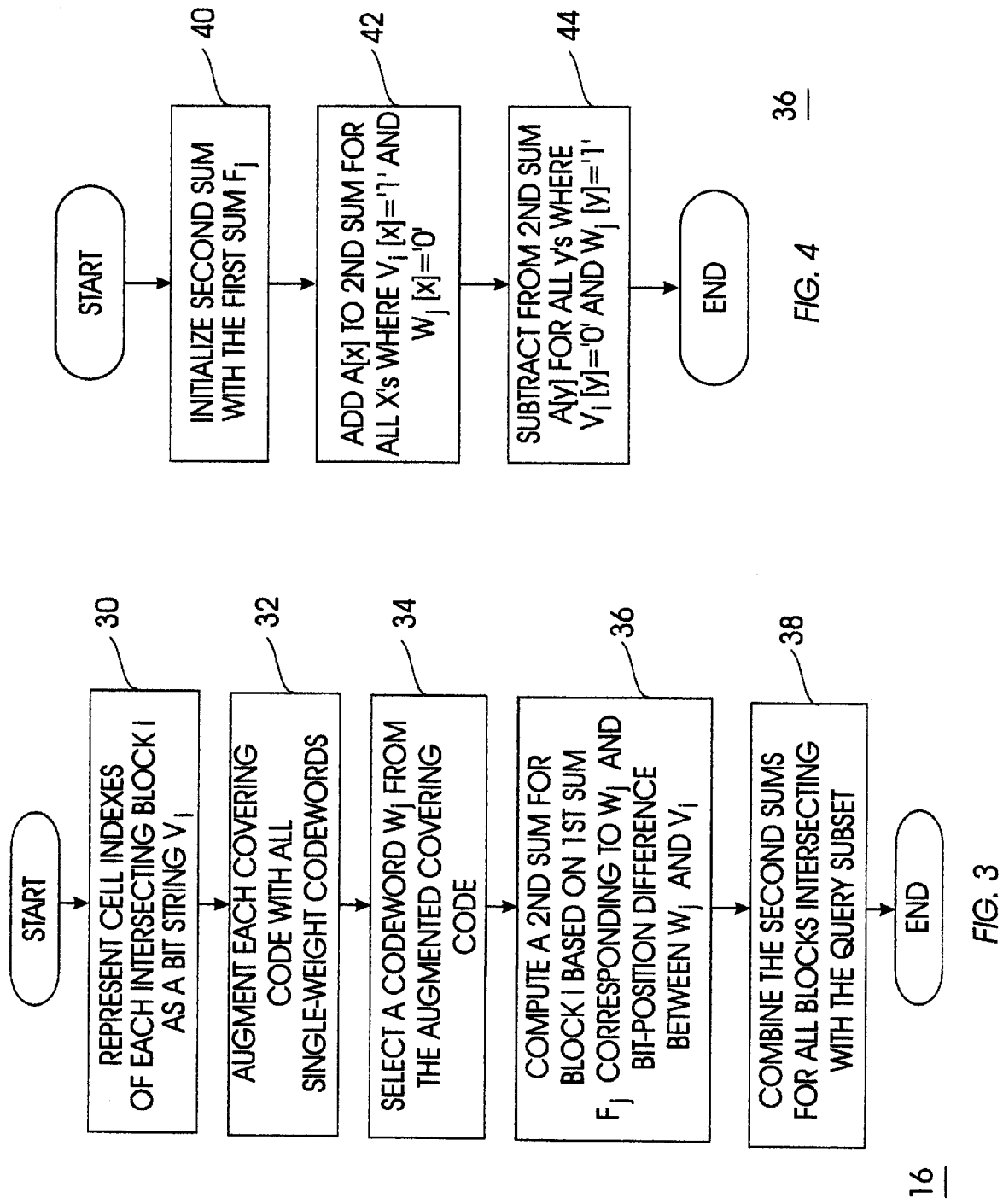

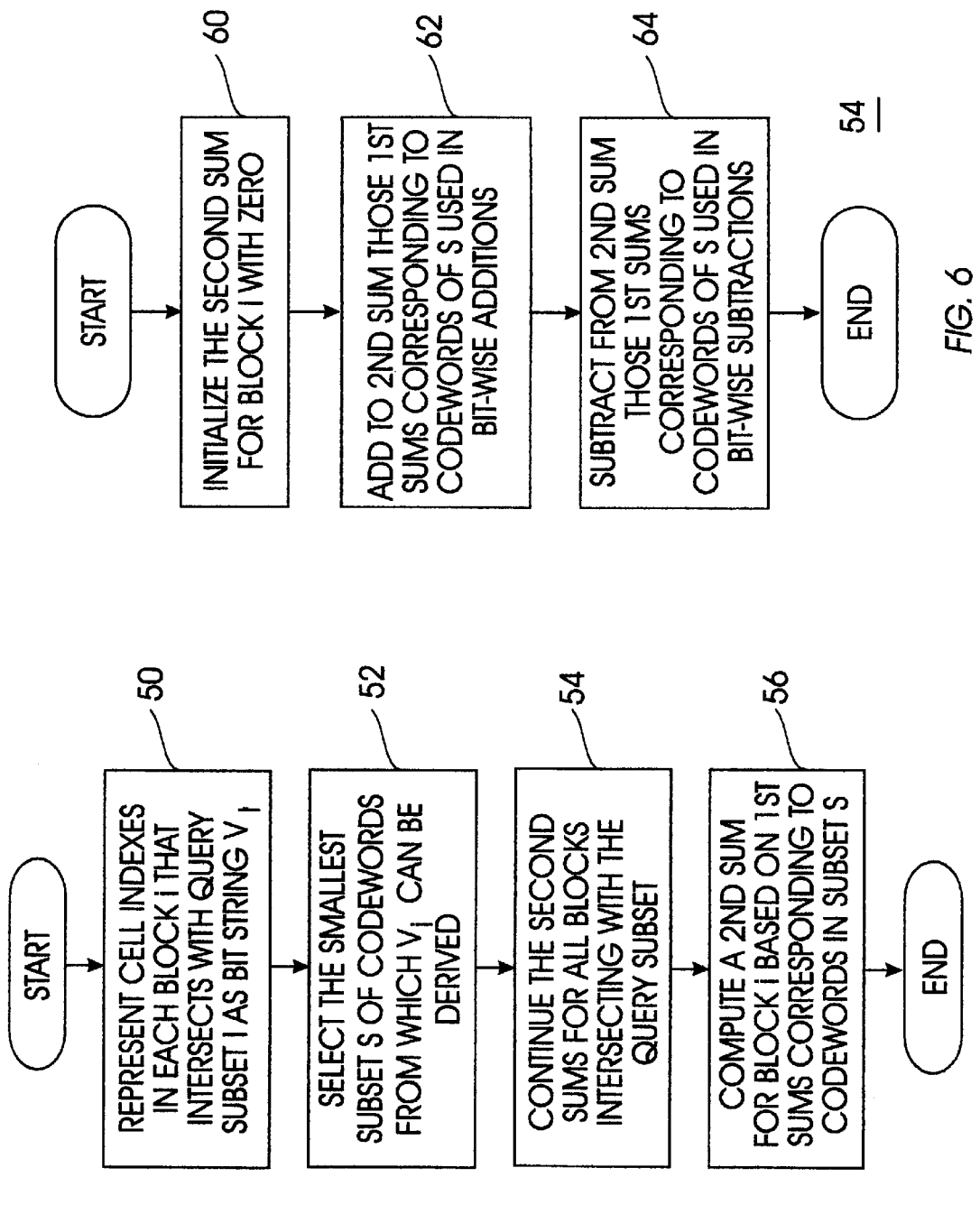

METHOD AND SYSTEM FOR PERFORMING PARTIAL-SUM QUERIES ON A DATA CUBE

FIELD OF THE INVENTION

The present invention relates to computer databases, and in particular to a method and system for performing partial-sum queries in a database in which data is represented as a multi-dimensional data cube.

BACKGROUND OF THE INVENTION

On-Line Analytical Processing (OLAP) has recently emerged as an important business application of aggregate databases built from data warehouses. The output from the OLAP application may be used for synthesizing new data or extracting useful patterns from the database, as in data mining applications. An increasingly popular data model for OLAP applications is the multi-dimensional database (MDDB), also known as data cube. The data cube model is described, for example, by J. Gray et al. in *"Data Cube: A Relational Aggregate Operator Generalizing Group-bys, Cross-tabs and Sub-totals,"* Proc. of the 12th Int'l Conf. On Data Engineering, pp. 152–159, 1996.

To build an MDDB from a data warehouse, certain attributes (typically from 5 to 10) of the data records are selected. Each data record of the MDDB contains a value for each of the data attributes. One of these attributes is typically chosen as a metric of interest and referred to as a measure attribute. The remaining attributes, say d of them, are referred to as functional attributes which correspond to the dimensions of the data cube. The measure attribute values of all the records having the same combination of functional attributes are combined (e.g., summed up) into a single value. Thus, an MDDB can be viewed as a d-dimensional array, indexed by the values of the d functional attributes, whose cells contain the values of the measure attribute for the corresponding combination of the functional attribute values.

For example, a data cube representing data for an insurance company may have four dimensions corresponding to the functional attributes age, year, state, and insurance type, respectively. Assuming that the domain of age is from 1 to 100, of year is from 1985 to 1996, of state is the 50 states in U.S., and of insurance type is the set {home, auto, health} representing the type of insurance purchased by a customer. The data cube thus has 100×12×50×3 cells, with each cell containing the total revenue (the measure attribute in this case) for the corresponding combination of age, year, state, and type attribute values.

Furthermore, the above data cube may be extended by augmenting the domain of each functional attribute with an additional value, denoted by "all", to store the values of the measure attribute in all of the cells along that functional attribute. In the above example, the data cube will be extended to include 101×13×51×4 cells. With this extension, any query of the form (age, year, state, type), where the queried value for each attribute is either a single value in its domain or all, can be answered by accessing a single cell in the extended data cube. For instance, the total amount of revenue for the auto insurance in the whole U.S. in 1995 is a query specified by (all, 1995, all, auto), which can be answered in one cell access. Such queries are referred to as singleton queries.

An important class of queries in multi-dimensional databases involves the SUM aggregation of a group of cells selected from the data cube, where the values of interest for some functional attributes are specified as subsets, not necessarily in contiguous ranges, in their domains. These are referred to as partial-sum queries, and are frequently applied to categorical attributes due to their lack of natural semantics in ordering. For instance, the 50 states in the United States may be ordered alphabetically. However, a query may select the top 10 states with the largest populations, all states that are in the Pacific Standard Time zone, or all states that have one or more NFL football teams. In all these cases, the selected values of the functional attribute state are not contiguous because the states of interest are not necessarily in an alphabetical order.

The partial-sum queries may also apply to numeric attributes. For instance, if the functional attribute year is changed to year-quarter or year-month, then a query may select all first quarters from the past 10 years, or may select all December months from the past 10 years. In both cases, the selected values of the functional attributes year-quarter or year-month are not contiguous.

In an interactive exploration of the data cube, which is the predominant OLAP environment, it is essential that the query system produces a result with an almost instantaneous response time. It is thus desirable to have a method that can generate a partial-sum from the data cube quickly, regardless of the size of the region of the data cube being queried upon and without naively summing the necessary cells one-by-one.

In the assignee's pending patent application Ser. No. 08/764,564, a method is described for generating a range-sum query in a data cube, where the query ranges are contiguous. The method comprises the steps of selecting a subset of the data cube dimensions, computing a set of prefix-sums along the selected dimensions using the aggregate values, and generating a range-sum based on the computed prefix-sums. However, such a method cannot be applied to partial-sums because in many partial-sum query instances, the selection over the domain of a functional attribute is not necessarily contiguous.

In another pending application of the assignee, Ser. No. 08/808,046, a method is described for performing a range max/min query in a database represented as a multi-dimensional data cube. The method comprises the steps of: (i) partitioning the data cube into a multi-level structure of d-dimensional blocks, (ii) representing the blocks as a multi-level tree structure where the tree nodes correspond to the blocks, (iii) for each block, determining the index to the cell with the maximum or minimum value, (iv) storing the cell indexes in the corresponding nodes, and (v) generating the range max/min result from the values of the cells selected from those in the query region. However, the method described there requires that the selection over a functional attribute be contiguous and that the aggregation operator is MAX or MIN, rather than SUM or other similar binary operators. Therefore, this method cannot be used for a partial-sum query.

In the paper *"Implementing Data Cubes Efficiently,"* Proc. of the ACM SIGMOD Conf. on Management of Data, June 1996, V. Harinarayan et al. describe techniques for efficiently constructing a data cube by determining what subset of the data cube to pre-compute in answering a singleton query. Since many data cells must be examined in a typical partial-sum query, as opposed to a single cell access in a singleton query, the methods described by Harinarayan et al. are not suitable for answering a partial-sum query.

Still other methods for processing multi-dimensional aggregates are described by J. Srivastava et al. (*"TBSAM: An Access Method for Efficient Processing of Statistical*

*Queries,"* IEEE Transaction on Knowledge and Data Engineering, 1(4), 1989). These methods, however, are designed for indexing the pre-computed aggregates or for incrementally maintaining them, but not for efficiently performing partial-sum queries over multiple dimensions of the data cube.

Therefore, there remains a need for an efficient method for performing partial-sum queries in a database in which data is represented as a multi-dimensional data cube. The method allows queries with a selection of cells, not necessarily contiguous, over multiple attribute dimensions to be processed quickly, and takes advantage of an inverse aggregate operator in processing the queries.

SUMMARY OF THE INVENTION

It is an object of the present invention to provide an efficient method and system for performing partial-sum queries on a d-dimensional data cube representing data in an OLAP system, using covering codes.

It is another object of the present invention to provide a partial-sum query method and system with better response time and reduced space overhead, by augmenting the covering codes to make them more suitable for solving partial-sum queries.

To achieve these and other objects, the present invention provides a method for performing a partial-sum query on a d-dimensional data cube comprising the steps of: (i) partitioning the data cube into a plurality of d-dimensional blocks; (ii) selecting one or more covering codes for each block of the data cube (covering codes and their characteristics are described in detail in the preferred embodiment section); (iii) computing a set of partial sums for each block, based on the covering codes selected for the block; and (iv) combining the partial sums corresponding to those blocks of the data cube that intersect with the query subset to generate the result.

In accordance with the invention, each covering code of a block corresponds to one of the block's dimensions, and each partial sum of the block is based on a Cartesian product of selected codewords. Each of these codewords is selected from the covering code for the respective dimension of the block. Preferably, the code length of each covering code is equal to a multiplication product of the respective lengths of the block in its selected dimensions.

In the case of a one-dimensional array, the covering codes are augmented to become single-weight extended covering codes to better reflect the requirements of the partial-sum problem. For each block i that intersects with the query subset, the indexes to the cells in the block are represented as a binary bit string $V_i$. A codeword $W_j$ is selected from the augmented covering code such that $W_j$ has the smallest Hamming distance (as described below) to $V_i$. A second partial-sum for this block is computed based on its first partial sum corresponding to $W_j$ and the bit-position difference between $W_j$ and $V_i$. The second sums of the blocks that intersect with the query subset are then summed up as the query result.

In another preferred embodiment of the invention, the covering codes are modified to become composition-extended covering codes to provide even better time-space trade-offs in the one-dimensional case. For each block i, a smallest subset S of the codewords for the block is selected such that the bit string $V_i$ can be derived from a combination of bit-wise additions and subtractions of the selected codewords. A second partial-sum is computed for the block based on the block's first partial sums, where each first partial sum was generated using one of the selected codewords. The query result is derived from the second partial-sums of those blocks that intersect with the query subset, as in the case of single-weight covering codes.

In the case of a multidimensional data cube, the d-dimensional indexes to the cells in each block i intersecting with the query subset are represented as a product of d binary bit strings $V_z$'s, where each bit string $V_z$ corresponds to a data cube dimension z, for $1 \leq z \leq d$. The covering codes are also augmented as single-weight extended covering codes as above. For each block i and for each dimension z of the data cube, where $1 \leq z \leq d$, a codeword $W_z$ is selected from the augmented code such that $W_z$ has the smallest Hamming distance to the bit string $V_z$. Hamming distance will be described in the preferred embodiment section below. A second partial-sum for the block i is computed based on a combination of the codeword $W_z$ and a bit-position difference between $W_z$ and $V_z$, over all dimensions z of the data cube, for $1 \leq z \leq d$. The second partial-sums for all blocks that intersect with the query subset are combined to generate the query result.

In another aspect of the invention, a database system with means for performing the method steps of the invention and a computer-program-product implementing the methods of the invention are also described.

Additional objects and advantages of the present invention will be set forth in the description which follows, and in part will be obvious from the description and with the accompanying drawing, or may be learned from the practice of this invention.

BRIEF DESCRIPTION OF THE DRAWINGS

FIG. 1 is a high-level flow chart showing the general operation of the method for performing a partial-sum query on a data cube, in accordance with the present invention.

FIG. 2 illustrates a simple two-dimensional data cube partitioned into four two-dimensional blocks of equal size, according to step 10 of FIG. 1.

FIG. 3 is a flow chart showing further details of step 16 of FIG. 1, for generating the partial-sum query result, when the data cube is one-dimensional and single-weight extended covering codes are used.

FIG. 4 is a flow chart showing a preferred embodiment of step 36 of FIG. 3, for computing a second sum for the block i, based on a first sum $F_j$ of the block i and the bit-position difference between the codeword $W_j$ and $V_i$.

FIG. 5 is a flow chart showing further details of step 16 of FIG. 1, for generating the partial-sum query result, when the data cube is one-dimensional and composition-extended covering codes are used.

FIG. 6 is a flow chart showing a preferred embodiment of step 56 of FIG. 5, for computing a second sum for the block i based on a plurality of first sums $F_j$'s.

DESCRIPTION OF THE PREFERRED EMBODIMENT

Figure 7:
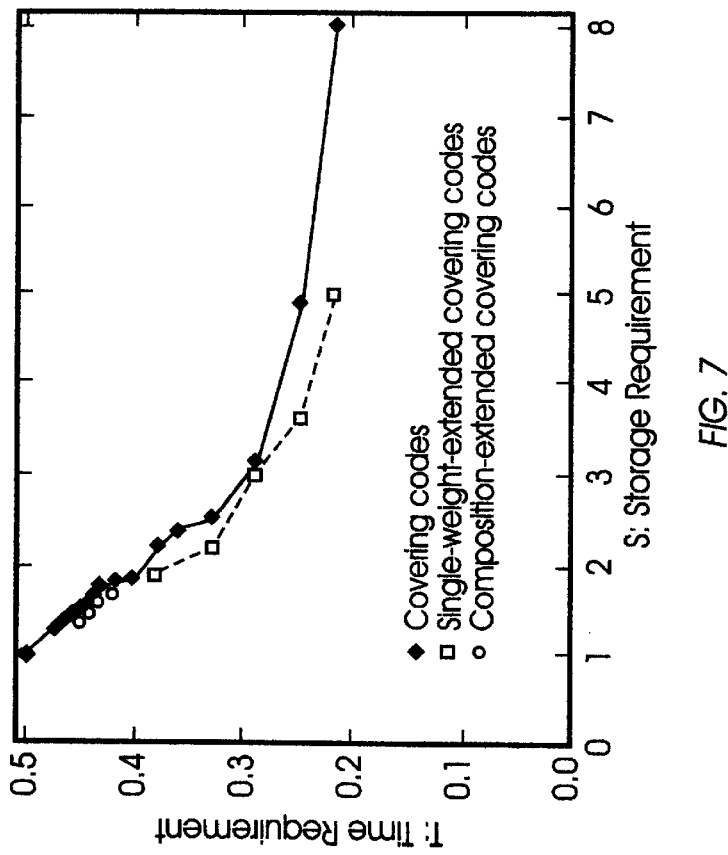
FIG. 7 represents a graph of the best (s,t)-pairs for partial-sums obtained using the method of the invention, with existing covering codes, new single-weight-extended covering codes, and new composition-extended covering codes.

The invention will be described primarily as a method for performing a partial-sum query in a multi-dimensional database. However, persons skilled in the art will recognize that an apparatus, such as a data processing system, including a CPU, memory, I/O, program storage, a connecting bus, and other appropriate components, could be programmed or otherwise designed to facilitate the practice of the method of the invention. Such a system would include appropriate program means for executing the method of the invention.

Also, an article of manufacture, such as a pre-recorded disk or other similar computer program product, for use with a data processing system, could include a storage medium and program means recorded thereon for directing the data processing system to facilitate the practice of the method of the invention. Such apparatus and articles of manufacture also fall within the spirit and scope of the invention.

OVERVIEW OF THE PARTIAL-SUM PROBLEM

The partial-sum query problem will be first described in formal terms, using a simple one-dimensional data array as an example, and then generalized for the case of a multi-dimensional query. Unless a specific embodiment is preferred for a particular step in the one-dimensional case, most steps in the d-dimensional query method similarly apply to the one-dimensional case by setting d=1. Let A be an array of size m, indexed from 0 though (m−1), where the values of the array elements are known in advance. Let M={0, 1, . . . , m−1} be the set of index domain of A. Given a subset of A's index domain I ⊂ M at query time, a partial sum of A specified by I is given by:

$$Psum(A, I) = \sum_{i \in I} A[i] \quad (1)$$

For example, consider the following array A with six elements, A=(259, 401, 680, 937, 452, 63). If the query subset is I={0, 1, 5}, then the partial-sum would be computed as Psum(A, I)=259+401+63=723. If the query subset is I={0, 3, 4}, then the partial-sum would be Psum(A, I)=259+937+452=1648.

In processing a partial-sum query, two important metrics are often used to measure the cost of finding the partial-sum result: a time overhead T and a space overhead S. A conventional partial-sum computation typically requires an access to an element of the array A, followed by an addition of its value to an existing cumulative partial sum. These steps are repeated until all the elements of A specified by the query are added to the cumulative partial sum. Thus, a time step can be modeled as the average time for accessing one array element and executing one arithmetic operation. In an algorithm for finding the partial sum, T is defined as the maximum number of the time steps required by the algorithm (over all possible input I's), and S as the number of storage cells required for the execution of the partial-sum operation. These storage cells may be used for the original array A and the data computed during the algorithm's intermediate steps.

In the conventional query method just described, the space overhead is S=m, while the worst-case time complexity is T=m (which occurs when I=M). On the other hand, if one precomputes and stores all possible combinations of partial sums (S=$2^m−1$), then only one data access is needed (i.e., T=1). However, this solution would not be practical when the array A has a large number of data cells (i.e., a large m). The invention was thus motivated by observing that if only the total sum of A, say, $$A[*] = \sum_{i=0}^{m-1} A[i],$$

is precomputed, then the worst-case time complexity for any partial sum can be reduced from m to ⌈m/2⌉. This is because a partial sum can also be derived from A[*]−Psum(A, I'), where I'=M−I. For instance, in the above query example, the sum of the elements A[*]=2792 may be stored as precomputed data. Assume that I={0, 1, 2, 4, 5}, then Psum(A, I)=A[*]−A[3]=2792−937=1855. For clarity, we will consider the normalized measures for time and space, namely, an (s,t) pair where s=S/m and t=T/m. Using A[*], a pair (s,t) can be obtained where (s, t)=((m+1)/m, ⌈m/2⌉)≈(1, 0.5).

Prior art methods for answering a partial-sum query typically include either (s,t)=(1, 0.5) or (s,t)=($2^m$/m,1/m). To accommodate a wide range of system storage size, s is usually a small constant, say less than 5 or so. Thus, it is desirable to have a query method that can achieve a suite of (s, t) pairs where s is in the range of 1 to 5 and t is less than 0.5 (the smaller the better), by using additional storage space to speed up the query processing.

FIG. 1 is a high-level flow chart illustrating the basic steps of the method for performing a partial-sum query in a d-dimensional database, in accordance with the invention. The database typically has numerous records, each containing the value of one or more data attributes. One of these attributes is used as a measure attribute while the remaining attributes are functional attributes. The database can be viewed as a d-dimensional array (or data cube), where each dimension represents a functional attribute and each cell contains the combined value of the respective functional attributes. A partial sum query thus corresponds to the sum of an appropriate subset I of the cells in the data cube, as specified by the query input.

In general, the method of the invention computes intermediate partial sums for smaller portions of the data cube, based on covering codes selected for the portions, and then combines the partial sums corresponding to the query region of the data cube to obtain the query result. Although the invention will be described in detail using the operators SUM (ADDITION) and SUBTRACTION, i.e., + and −, it similarly applies to any other binary operator ⊕ for which there exists an inverse binary operator ⊖, such that x⊕y⊖y=x for any x and y in the domain. Examples of such an (⊖, ⊕) operator pair include (+, −), (bitwise-exclusive-or, bitwise-exclusive-or), (exclusive-or, exclusive-or), and (multiplication, division). The SUM (+) operation is used as an example because SUM is the most prevalent aggregation operation in OLAP applications. Other common OLAP aggregation operators, such as COUNT and AVERAGE, can also be applied using the same algorithm because COUNT is a special case of SUM and AVERAGE can be obtained by keeping the 2-tuple (sum, count).

Starting with step 10 of FIG. 1, the data cube is partitioned into multiple dimensional blocks. Preferably, these blocks have the same length in each dimension (and thus the same size for the blocks) to simplify the implementation of the query method. In step 12, one or more covering codes are chosen for each block, where each dimension of the block corresponds to one of the codes selected for that block. Each covering code has a code length which is a function of the block length in the respective dimension of the block. Covering codes and their characteristics are described in more detail below. Preferably, the length of each covering code for a particular block is a multiplication product of the lengths of that block in selected dimensions of that block. In step 14, one or more partial sums are computed for each block (referred to as first sums), based on the covering codes chosen for the block. At query time, the result of the partial-sum query is computed by combining the first sums of the blocks that intersect with the query subset I, as shown by step 16. In effect, the query subset I has been partitioned into multiple disjoint subsets of I, where each subset of I corresponds to one of the blocks.

FIG. 2 illustrates a simple two-dimensional data cube 20 representing an insurance company's database. The dimensions of the data cube 20 correspond to the two functional attributes of each insured customer: age and year. In accordance with step 10 of FIG. 1, the data cube 20 is partitioned in this case into four blocks 22. Each of blocks 22 preferably has the same block length in its two dimensions, as shown.

COVERING CODES

A brief review of covering codes and terminologies pertinent to the present invention is now provided. A code is a set of codewords where each codeword defines a valid string of digits. Although binary codes of fixed-length codewords will be used as examples in describing the invention, the method of the invention is not limited only to this code type. In addition, throughout the specification, a binary vector may be represented as a bit string (e.g., 1010100), and that both of the terms vector and bit string will be used interchangeably. The bit-position of a length-m bit string (or vector) is labeled from 0 through m−1 from left (the most significant bit) to right (the least significant bit). Also, R* (V) denotes any bit rotation of a vector V and "|" denotes a concatenation of two bit strings (vectors).

The Hamming weight of a length-m binary vector $V=(b_0 b_1 \ldots b_{m-1})$ is the value of $$\sum_{i=0}^{m-1} b_i,$$

i.e., the number of 1-bits in this vector. The Hamming distance of two binary vectors V and V', denoted as Hamming (V, V'), is the Hamming weight of V⊕V', where ⊕ is the bit-wise exclusive-or operator. For instance, the Hamming weight of the vector V=(0010110) is 3. The Hamming distance between V=(0010110) and V'=(0010001) is also 3, which is the Hamming weight of V⊕V'=(0000111). In the present specification, the weight of a codeword or a vector always means its Hamming weight.

The covering radius R of a binary code is the maximum Hamming distance of any vector of the same length from a codeword (a vector in the code). A binary code C is called an (n, K, R)-covering code if: (1) each codeword is of length n; (2) there are K (valid) codewords in C (out of all $2^n$ possible combinations in the vector space); and (3) the covering radius of the code is R. As an example, a code C={(00000), (11111)} is a (5, 2, 2)-covering code because n=5, K=2 and R=2. For this code, R=2 because every binary vector of length 5 is within distance 2 from either codeword (00000) or codeword (11111). As another example, Table 1 below shows the code C={(00000), (00111), (10000), (01000), (11011), (11101), (11110)} as a (5, 7, 1)- covering code because all 32 vectors ($2^5$ combinations) are within distance 1 from one of the 7 codewords of the code C.

The term covering radius is intuitive. First, view the K codewords as K marked nodes with corresponding addresses in an n-dimensional binary hypercube. The growing spanning trees of depth R rooted from each marked node, based on the definition of the covering codes, will collectively cover (or touch) all $2^n$ hypercube nodes. For convenience, an m-bit "mask" of I is defined as a mask(I)=$(b_0 b_1 \ldots b_{m-1})$ where $b_i=1$ if i∈ I, and $b_i=0$ otherwise. Also, if V=mask(I), then the set I will be called the "support" of vector V, denoted as support(V)=I. (Support and mask are inverse functions). For instance, if m=5, I={0, 1, 3} mask(I)= (11010). Also, support((11010)) is equal to {0, 1, 3}.

TABLE 1

| Weight | Vectors | The closest codeword | Distance |
|---|---|---|---|
| 0 | (00000) | itself | 0 |
| 1 | R*(00001) | (00000) or itself | 0 or 1 |
| 2 | (00)|R*(001) | (00111) | 1 |
|   | (01)|R*(001) | (01000) | 1 |
|   | (10)|R*(001) | (10000) | 1 |
|   | (11000) | (01000) or (10000) | 1 |
| 3 | (00111) | itself | 0 |
|   | (01110) | (11110) | 1 |
|   | (11100) | (11110) or (11101) | 1 |
|   | (11001) | (11011) or (11101) | 1 |
|   | (10011) | (11011) | 1 |
|   | (01011) | (11011) | 1 |
|   | (10110) | (11110) | 1 |
|   | (01101) | (11101) | 1 |
|   | (11010) | (11011) or (11110) | 1 |
|   | (10101) | (11101) | 1 |
| 4 | (01111) | (00111) | 1 |
|   | (11110) | itself | 0 |
|   | (11101) | itself | 0 |
|   | (11011) | itself | 0 |
| 5 | (11111) | any weight-4 codeword | 1 |

Referring again to step 14 of FIG. 1, each first sum for a block is preferably computed as a Cartesian product of the codewords selected from the covering code for a respective dimension of the block. For example, each first sum of the block may be equal to the sum of the values of the cells selected from that block, where the bits indexing these cells, in selected codewords, are all 1's. Note that the cells of the block are indexed in each dimension by the bits of a codeword selected from the covering code corresponding to that dimension of the block.

An example of a partial-sum query based on the method represented by FIG. 1 and the just reviewed codes is now described. Assume the data cube is a one-dimensional array A having 10 cells (m=10), identified by A[0] through A[9], and that the values of cells A[0] through A[9] are 3, 5, 2, 5, 6, 11, 4, 7, 8, 10, respectively. In accordance with step 10 of FIG. 1, the array A is partitioned in this case into two blocks, each of size 5, such as (3, 5, 2, 5, 6) and (11, 4, 7, 8, 10). In step 12, one or more covering codes are selected for each block. For example, the same (5, 7, 1)-covering code listed in Table 1 is selected here for both blocks. Note that the (5, 7, 1)-covering code has a same length (5) as the length of each block (which is also the block size because the block is one-dimensional). In accordance with step 14 of FIG. 1, the first sums for each block are computed next based on the cells indexed by the codewords selected for the block and the (5, 7, 1)-covering code. Let W0, W1, . . . , W6 denote the 7 codewords in the (5, 7, 1)-covering code, respectively, i.e., W0=(00000), W1=(00111), W2=(10000), W3=(01000), W4=(11011), W5=(11101), and W6=(11110). The first sums corresponding to the 7 codewords, for the first block, can be derived as 0, 13, 3, 5, 19, 16, 15, respectively. For example, the first sum corresponding to the codeword W1=(00111) of the first block is derived as A[2]+A[3]+A[4]=2+5+6=13. Here, the value of cells A[2], A[3] and A[4] are added together because the 2nd, 3rd and 4th bits (the left-most bit being the 0-th bit) of the codeword (00111) are all 1's.

Similarly, the first sums corresponding to the 7 codewords, {(00000), (00111), (10000), (01000), (11011), (11101), (11110)} for the second block can be derived as 0, 25, 11, 4, 33, 32, 30, respectively. For instance, the first sum corresponding to the codeword W6=(11110) for the second block is derived as A[5]+A[6]+A[7]+A[8]=11+4+7+8=30. Here, the value of cells A[5], A[6], A[7] and A[8] are summed up because the 0-th, 1st, 2nd and 3rd bits of the codeword for the second block are all 1's. Since the codeword is for the second block, a base of index 5 is added to the positions of the 1-bits (as an offset) before applying these positions to the indices of the array A.

Assume in this example that the query subset is I={1, 2, 3, 4, 5, 7, 8}. A conventional method for answering the partial-sum query Psum (A, I) is to sum up A[1]+A[2]+A[3]+A[4]+A[5]+A[7]+A[8]=44, one by one, requiring a total of 7 memory references and 6 additions. Using the method of the invention, at query time, one can partition the query subset I into two disjoint subsets I1={1, 2, 3, 4} and I2={5, 7, 8}, where the subset I1 intersects with (or touches) the first block and the subset I2 intersects with the second block. Then, Psum (A, I) may be derived from Psum (A, I)=Psum (A, I1)+Psum (A, I2). In this example, Psum (A, I1)=Psum (A, {1, 2, 3, 4}) can be derived as Psum (A, {2, 3, 4})+Psum (A, {1})=Psum (A, support (W1))+A[1]=13+5=18.

Here, W1 is the closest codeword to the codeword support (I1), having a Hamming distance of only one. Similarly, Psum (A, I2)=Psum (A, {5, 7, 8}) can be derived as Psum (A, {5, 6, 7, 8})–Psum(A, {6})=Psum (A, support (W6 of the second block))–A[6]=30–4=26. The final partial sum Psum (A, I) is then derived by simply summing up Psum (A, I1)+Psum (A, I2)=18+26=44. It can be seen that only 4 memory references and 3 arithmetic operations (additions or subtractions) are needed using the method of the invention, as compared to 7 cell references and 6 additions using the conventional method.

SINGLE-WEIGHT CODES ON ONE-DIMENSIONAL DATA CUBES

In applying (n, K, R)-covering codes to the partial-sum problem described earlier, we chose codes with a minimum radius R and a minimum number of codewords K, given a length n of the codewords. Minimizing the time for the partial-sum problem is different from minimizing the covering radius R, given an (n, K,R)-covering code, in two aspects. First, the all-0 vector (00 . . . 0) need not be covered since the corresponding partial sum is always 0. Second, the n weight-1 vectors can be included in the covering code without a space cost since they are present in the array A, which may reduce the covering radius R. The value of K' will be used throughout this section to denote the number of codewords, excluding the all-0 vector and all weight-1 vectors.

To make the covering codes more suitable to solving the partial-sum problem, they are now modified and referred to as single-weight extended covering codes. A single-weight codeword is a codeword that has exactly one 1-bit in its bit-string. For instance, if n=5 then the single-weight codewords are: (10000), (01000), (00100), (00010), (00001). A binary code C is an (n, K', R) single-weight-extended covering code, denoted (n, K', R)$^+$ covering code, if (1) each codeword is of length n; (2) there are K' codewords in C; and (3) lefting C'=C∪{R* (00 . . . 01)}, i.e., C is extended with all n weight-1 vectors, the covering radius of the code C' is R. In deriving efficient algorithms for partial sum queries, one of the objectives is to have (n, K', R)$^+$-covering codes with minimum R and K', for various given small values of n. Since the all-0 vector always has a distance of one from any weight-1 vector and R≧1 for all cases considered, covering the all-0 vector does not increase the complexities of K' and R of the code. Clearly, an (n, K, R)-covering code C is also an (n, K-c, R)$^+$-covering code, if the covering code C contains c all-0 vectors and weight-1 vectors. Given an (n, K', R)$^+$-covering code, the method for performing a partial-sum query in a one-dimensional array A based on the (n, K', R)$^+$-covering code remains generally the same as for a (n, K, R)-covering code. The use of the single-weight extended covering code improves the performance of the partial-sum query method in terms of time and space overheads.

FIG. 3 shows further details of step 16 of FIG. 1, for generating the partial-sum result, when the data cube is a one-dimensional array A, and the covering codes are binary single-weight extended codes of fixed-length codewords. At step 30, the cell indexes in each block i that intersects with the query subset I are represented as a binary bit string $V_i$. Each binary covering code for block i is then augmented with all single-weight codewords to become a single-weight extended covering code, in step 32. A codeword $W_j$ is then selected from the augmented covering code, in step 34, such that $W_j$ has the smallest Hamming distance to the bit string $V_i$. A second sum is computed for the block i, in step 36, using a first sum $F_j$ of the block i (which was computed in step 14 of FIG. 1) and the bit-position difference between $V_i$ and $W_j$. This particular first sum $F_j$ was generated from the values of the cells indexed by the bits of the codeword $W_j$. Next, in step 38, the partial-sum result is generated from the second sums of all the blocks of the data cube that intersect with the subset I.

FIG. 4 is a flow chart showing a preferred embodiment of step 36, for computing a second sum based on the first sum $F_j$ of the block i and the bit-position difference between the bit string $V_i$ and the codeword $W_j$. Starting at step 40, the second sum is initialized to the first sum $F_j$. For every index x of the array A such that the x-th bit of the bit string $V_i$ is "1" and the x-th bit of the codeword $W_i$ is a "0", the value of array element A[x] is added to the second sum, as shown by step 42. Also, for every index y of the array A such that the y-th bit of the bit string $V_i$ is "0" and the y-th bit of the codeword $W_i$ is a "1", the value of array element A[y] is subtracted from the second sum, as shown by step 44.

COMPOSITION-EXTENDED COVERING CODES ON ONE-DIMENSIONAL DATA CUBES

The covering codes are now further modified by adding a composition function, resulting in a new class of codes which will be referred to as composition-extended covering codes. Some new notations are now introduced. Let e be the bit-wise OR operator, ⊕ be the bit-wise AND operator, and ⊕ be the bit-wise exclusive-or operator. Let ⊥ denote an undefined value. A composition function of two binary vectors V and V' is given by:

$$comp(V, V') = V \odot V' = \begin{cases} V \ominus V', & \text{if } V \oplus V' = 0; \\ V \otimes V', & \text{if } V \oplus V' = V \text{ or } V \oplus V' = V'; \\ \bot, & \text{otherwise}. \end{cases} \quad (2)$$

For examples, comp((001), (011))=(010), comp((001), (010))=(011)) and comp((011), (110))=⊥. Let V and V' be two n-bit vectors where V"=comp(V, V') ≠⊥. Also let I, I', and I" be support(V), support(V'), and support(V"), respectively. Then, given Psum(A, I) and Psum(A, I'), one can derive Psum(A, I") in one addition or subtraction operation as follows.

$P\text{sum}(A, I'') = P\text{sum}(A, I) + P\text{sum}(A, I')$ if $V \oplus V' = 0$;

$P\text{sum}(A, I'') = P\text{sum}(A, I) - P\text{sum}(A, I')$ if $V \oplus V' = V$; and $P\text{sum}(A, I'') = P\text{sum}(A, I') - P\text{sum}(A, I)$ if $V \oplus V' = V'$.

For consistency, $\text{comp}(V, V')$ is set to the undefined value $\perp$ if either V or V' is equal to $\perp$. Assume that the operator $\odot$ associates from left to right, i.e., $V \odot V' \odot V'' = (V \odot V') \odot V''$. Note that $\odot$ is commutative, but not associative. For instance, $(1100) \odot (1101) \odot (1010) = (1011)$, while $(1100) \odot ((1101) \odot (1010)) = \perp$.

A binary code C is an (n, K", R) composition-extended covering code, denoted (n, K", R)* -covering code, if: (1) each codeword is of length n, (2) there are K" codewords in C, and (3) every length-n non-codeword vector $V \notin C$ can be derived by up to R compositions of R+1 codewords, i.e., $$V = C_1 \odot C_2 \odot \ldots \odot C_{i+1}, \text{ for } 1 \leq i \leq R, C_i \epsilon C. \tag{3}$$

For example, consider a code C={(1111), (0111), (0110), (0101), (0011), (1000)}. It can be seen from Table 2 below that this code is a (4, 6, 1)* -covering code. This is because each codeword in C is of length n=4, there are K"=6 codewords, and every non-codeword vector can be derived by (R=1) composition of (R+1=2) codewords. Also, an (n,K', R)+-covering code is an (n, K'+n, R)* -covering code, but not vice versa. K" is used to denote the total number of codewords in a composition-extended covering code. Note that this code may not contain all weight-1 vectors as codewords.

TABLE 2

| Hamming weight | Vector | Composition | Minimum Distance |
|---|---|---|---|
| 1 | (0001) | (0111) ⊙ (0110) | 1 |
|   | (0010) | (0111) ⊙ (0101) | 1 |
|   | (0100) | (0111) ⊙ (0011) | 1 |
|   | (1000) | itself | 0 |
| 2 | (0011) | itself | 0 |
|   | (0110) | itself | 0 |
|   | (1100) | (1111) ⊙ (0011) | 1 |
|   | (1001) | (1111) ⊙ (0110) | 1 |
|   | (0101) | itself | 0 |
|   | (1010) | (1111) ⊙ (0101) | 1 |
| 3 | (0111) | itself | 0 |
|   | (1110) | (1000) ⊙ (0110) | 1 |
|   | (1101) | (1000) ⊙ (0101) | 1 |
|   | (1011) | (1000) ⊙ (0011) | 1 |
| 4 | (1111) | itself | 0 |

A method for performing a partial-sum query in a one-dimensional array A, based on an (n, K", R)* composition-extended covering code is now described. First, the array A is partitioned into $\lceil m/n \rceil$ blocks according to step 10 of FIG. 1, each of size up to n. Assume that m is a multiple of n. If not, the size of A can be extended to $\lceil m/n \rceil n$ by padding zero's to A. Alternatively, one can choose a different covering code of a length which is the same as the length of the last block, i.e., $m - (\lceil m/n \rceil - 1)n$. For convenience, the $\lceil m/n \rceil$ blocks are referred to as block 0 through block $\lceil m/n \rceil - 1$. In accordance with step 12 of FIG. 1, one or more covering codes are selected for each block i, which are (n, K", R)* composition-extended covering codes in this case.

The flow chart of FIG. 5 then shows another preferred embodiment of step 16 of FIG. 1, for generating the partial-sum result, respectively, when the data cube is a one-dimensional array and composition-extended covering codes (n, K", R)* are used. Starting with step 50, the indexes to the cells in each block i intersecting with the query subset I are represented as a binary bit string $V_i$. In step 52, the smallest subset S of codewords is selected from the (n, K", R)* covering codes for each block i such that the bit string $V_i$ can be derived from a combination of bit-wise additions and subtractions of the selected codewords. Next, in step 54, for each block i (of size n) that intersects with the query subset I, a second sum is computed using the block's first sums $F_j$'s where each sum $F_j$ corresponds to a codeword $W_j$ in S.

As described above for step 14 of FIG. 1, each first sum for a block is preferably computed based on a Cartesian product of codewords selected from the code for the respective dimension of the block. Since the data cube in this case has only one dimension, a block's first sum may be the sum of values in the cells indexed by the bits of a codeword from the set S. For example, a first sum may be the sum of values of the cells in the block, where the bits indexing these cells, in the selected codeword, are all 1's. That is, $F_j = \Sigma A[ni+y]$, $\forall y$, for $0 \leq y < n$, such that the y-th bit of $W_j$ is "1". Finally, in step 56, the second sums for all the blocks that intersect with the query subset I are summed together to arrive at the partial-sum result.

FIG. 6 shows further details of step 54 of FIG. 5, for computing a second sum for each block i that intersects with the query subset I, based on the first sums $F_j$'s computed for that block. In step 60, a variable representing the value of the second sum is initialized to zero. In step 62, the first sums corresponding to the codewords of the subset S that were used in the bit-wise additions for deriving the bit string $V_i$ (done in step 52) are added to the second sum. Also, those first sums corresponding to the codewords of the subset S that were used in the bit-wise subtractions for deriving the bit string $V_i$ are subtracted from the second sum, as shown by step 64. The result from the additions and subtractions in steps 62 and 64 then becomes the final second sum for the respective block.

The steps of FIGS. 5 and 6 can be formally described as follows. For each block i, let $V_i$ be the bit-string representing the cells in the block (step 50). A smallest subset of codewords $\{W_{j1}, \ldots W_{jz}\}$ is chosen (in step 52) so that there exists a combination of $s_{i \epsilon}\{1, -1\}$ such that $$V_i = \sum_{x=1}^{z} s_x w_{jx}. \tag{4}$$

For each block i, a second sum is calculated in step 54 according to Equation (5):

$$P\text{sum}(A, I^i) = \sum_{x=1}^{z} s_x F_{jx}^i \tag{5}$$

The final partial-sum result of all the blocks intersecting the query subsets is generated in step 56 by summing up the second sums for all blocks as:

$$P\text{sum}(A, I) = \sum_{i=0}^{[\min]-1} P\text{sum}(A, I^i) \tag{6}$$

Examples of some useful composition-extended covering codes found through a computer search are now described. For convenience, the codewords are represented in decimal form rather than in binary form.

A (6, 13, 1)* -covering code is given as C={1, 2,4, 6, 8, 16, 25, 32, 34, 36, 47, 55, 62}. This code improves from previous K"=K−c+n=15 (due to the (6, 12,1)-covering code) to K"=13. The number of weight-1 codewords is 6.

A (7, 21, 1)* -covering code is given as C={1, 2,4, 8, 16,24, 32, 33, 38, 39, 64, 72, 80, 91, 93, 94, 95, 122, 123, 124, 125}. This code improves from previous K"=22 (due to the (7, 16, 1) Hamming code) to K"=21. The number of weight-1 codewords is 7.

A (8, 29, 1)* -covering code is given as C={1, 2, 3, 4, 8, 16, 17, 18, 19, 32, 64, 76,100, 108, 128, 129, 130, 131, 144, 145, 146, 159, 183, 187, 191, 215, 219, 243, 251}. This code improves from previous K"=39 (due to the (8, 32, 1)-covering code) to K"=29. The number of weight-1 codewords is 8.

TABLE 3

| n     | K  | R       | c | K' | K" | s       | t          |
|-------|----|---------|---|----|----|---------|------------|
| m     | 2  | m/2     | 1 | —  | —  | 1 + 1/m | 0.50       |
| odd n | —  | (n − 3)/2 | — | 4  | —  | 1 + 4/n | 0.5 − 1/(2n) |
| 19    | —  | 8       | — | 4  | —  | 1.21    | 0.474      |
| 17    | —  | 7       | — | 4  | —  | 1.24    | 0.471      |
| 15    | —  | 6       | — | 4  | —  | 1.27    | 0.467      |
| 13    | —  | 5       | — | 4  | —  | 1.31    | 0.462      |
| 11    | —  | 4       | — | 4  | —  | 1.36    | 0.45       |
| 9     | —  | 3       | — | 4  | —  | 1.44    | 0.44       |
| 7     | —  | 2       | — | 4  | —  | 1.57    | 0.43       |
| 12    | 12 | 4       | 3 | —  | —  | 1.75    | 0.42       |
| 5     | 7  | 1       | 3 | —  | —  | 1.80    | 0.40       |
| 8     | —  | 2       | — | —  | 15 | 1.88    | 0.38       |
| 6     | —  | i       | — | —  | 13 | 2.17    | 0.33       |
| 7     | —  | 1       | — | —  | 21 | 3.00    | 0.29       |
| 8     | —  | 1       | — | —  | 29 | 3.63    | 0.25       |
| 9     | —  | 1       | — | —  | 45 | 5.00    | 0.22       |

A (9, 45, 1)* -covering code is given as C={1, 2, 3,4, 8, 16, 17, 18, 19, 32, 36, 40, 44, 64, 68, 96, 100, 104, 128, 132, 136, 140, 160, 232, 236, 256, 257, 258, 259, 272, 273, 274, 287, 347, 351, 383, 439, 443, 447, 467, 471, 475, 479, 499, 503}. This code improves from previous K"=70 (due to (9, 62, 1)-covering code) to K"=45. The number of weight-1 codewords is 9.

A (8, 15, 2)* -covering code is given as C={1, 2, 3, 4, 8, 16, 32, 33, 34, 64, 115, 128, 191, 204, 255}. This code improves from previous K"=17 (due to (8, 12, 2)-covering code) to K"=15. The number of weight-1 vectors is 8.

Table 3 above summarizes the best (s, t)-pairs obtained using the method of the invention with existing covering codes, new single-weight-extended covering codes, and new composition-extended covering codes described so far. The data points corresponding to these (s, t)-pairs are plotted in the graph of FIG. 7. For example, the entry (s, t)=(1.44, 0.44) implies that with 44% additional storage, one can improve the query response time by about 12% (i.e., from t=0.5 to t=0.44). Another entry (s, t)=(2.17, 0.33) means that if we roughly double the storage requirement, the query response time can be improved by about 34%.

A specific implementation of the partial-sum query method represented by FIGS. 1–6, is described next. As before, assume that the length m of a bit-string is a multiple of n, where n is the length of the chosen covering code, and that the same covering code is selected for all the blocks. If m is not a multiple of n, the size of A may be conceptually extended to ⌈m/n⌉*n by appending extra elements of value zero to A. For example, if m=18 and n=5, then two more elements of value zero, i.e., A[18]=A[19]=0, may be appended to the existing elements A[0] through A[17]. Alternatively, a different covering code having the same length as the size of the last block may be used for that block. For instance, a covering code of length n=5 may be used for the first three blocks and a different covering code of length 3 may be used for the last block. In the following discussion, assume that a known (K, n, R)-covering code exists and that c is the number of codewords of Hamming weight 1 or 0 in the code.

The array A is first restructured as a two-dimensional array A[i,j], where i indexes a block, $0 \leq i < \lceil m/n \rceil$, and j indexes an element of A within the block, $0 \leq j < n$. Thus, the new array A[i, j] is the same as the old one-dimensional array A[ni+j]. Then, for each block i, (K−c) partial sums are precomputed and stored in their A[i, j] cells, for $n \leq j < (n+K-c)$ in some arbitrary order (though the order is the same for all blocks). If a codeword has a Hamming weight 1, then its corresponding partial sum is in the original array A. If the codeword is (00 . . .0), then its corresponding partial sum is 0, which can be omitted.

TABLE 4

| Array A | Vector    | Initial or Precomputed Value                    |
|---------|-----------|-------------------------------------------------|
| [i,0]   | (10000)*  | A[5i]                                           |
| [i,1]   | (01000)*  | A[5i + 1]                                       |
| [i,2]   | (00100)   | A[5i + 2]                                       |
| [i,3]   | (00010)   | A[5i + 3]                                       |
| [i,4]   | (00001)   | A[5i + 4]                                       |
| [i,5]   | (00111)*  | A[5i + 2] + A[5i + 3] + A[5i + 4]               |
| [i,6]   | (11011)*  | A[5i] + A[5i + 1] + A[5i + 3] + A[5i + 4]       |
| [i,7]   | (11101)*  | A[5i] + A[5i + 1] + A[5i + 2] + A[5i + 4]       |
| [i,8]   | (11110)*  | A[5i] + A[5i + 1] + A[5i + 2] + A[5i + 3]       |

The augmented two-dimensional array A is a look-up table, referred to as a partial-sum look-up table, which includes the original elements of A (i.e., all n codewords with a Hamming weight 1 for each block) and selected precomputed partial sums for each block of A. Table 4 shows an example of the partial-sum look-up table for the i-th block of array A, based on the (5, 7, 1)-covering code from Table 1. The codewords of the (5, 7, 1)- covering code are marked with "*" in the Table 4. Also note that codeword (00000) is not needed in Table 4 because the corresponding partial-sum is 0, which can be omitted. The vector column in Table 4 is included for clarity only and not needed in the look-up table. There are ⌈m/n⌉ such partial-sum look-up tables, one for each block, where each table has (n+K−c) entries. Thus, a total of (n+K−c)⌈m/n⌉ storage cells is needed for all the blocks' partial-sum look-up tables.

In addition, a second look-up table with $(2^n-1)$ entries, called an index look-up table, is created for efficiently finding a closest codeword and the different bits between the vector V and the closest codeword. This table is indexed from 1 to $(2^{n-1})$. For each entry in the index look-up table, a list of (index, sign)pairs, denoted as $(j_1, s_1), (j_2, s_2), \ldots$, is stored so that the partial sum of the i-th block with vector V can be derived as $\Sigma (s_x * A[i, j_x])$ for all $(j_x, s_x)$-pairs defined in the list. Note that the list has at most (R+1) pairs. Following the same example, Table 5 below shows an example of an index look-up table, where an index of "−1" marks the end of the list and a question mark "?" marks a don't-care value. As before, the "vector" column is included here for clarity and is not needed in the implementation of this table. Also, it is possible to build the table so that the sign for the first index is always positive (such as the example given) and can be omitted.

TABLE 5

| Index | Vector  | 1st Index | 1st Sign | 2nd Index | 2nd Sign |
|-------|---------|-----------|----------|-----------|----------|
| 1     | (00001) | 4         | +1       | −1        | ?        |
| 2     | (00010) | 3         | +1       | −1        | ?        |
| 3     | (00011) | 3         | +1       | 4         | +1       |
| 4     | (00100) | 2         | +1       | −1        | ?        |
| 5     | (00101) | 2         | +1       | 4         | +1       |
| 6     | (00110) | 2         | +1       | 3         | +1       |
| 7     | (00111) | 5         | +1       | −1        | ?        |
| 8     | (01000) | 1         | +1       | −1        | ?        |
| 9     | (01001) | 1         | +1       | 4         | +1       |

TABLE 5-continued

| Index | Vector  | 1st Index | 1st Sign | 2nd Index | 2nd Sign |
|-------|---------|-----------|----------|-----------|----------|
| 10    | (01010) | 1         | +1       | 3         | +1       |
| 11    | (01011) | 6         | +1       | 0         | −1       |
| 12    | (01100) | 1         | +1       | 2         | +1       |
| 13    | (01101) | 7         | +1       | 0         | −1       |
| 14    | (01110) | 8         | +1       | 0         | −1       |
| 15    | (01111) | 5         | +1       | 1         | +1       |
| 16    | (10000) | 0         | +1       | −1        | ?        |
| 17    | (10001) | 0         | +1       | 4         | +1       |
| 18    | (10010) | 0         | +1       | 3         | +1       |
| 19    | (10011) | 6         | +1       | 1         | −1       |
| 20    | (10100) | 0         | +1       | 2         | +1       |
| 21    | (10101) | 7         | +1       | 1         | −1       |
| 22    | (10110) | 8         | +1       | 1         | −1       |
| 23    | (10111) | 5         | +1       | 0         | +1       |
| 24    | (11000) | 0         | +1       | 1         | +1       |
| 25    | (11001) | 7         | +1       | 2         | −1       |
| 26    | (11010) | 8         | +1       | 2         | −1       |
| 27    | (11011) | 6         | +1       | −1        | ?        |
| 28    | (11100) | 8         | +1       | 3         | −1       |
| 29    | (11101) | 7         | +1       | −1        | ?        |
| 30    | (11110) | 8         | +1       | −1        | ?        |
| 31    | (11111) | 8         | +1       | 4         | +1       |

As an illustration, assume the i-th block of the query subset I corresponds to the codeword (00011). We use the value of (00011), which is 3, to index this table. Using Table 5, the partial sum corresponding to (00011) in the i-block can be derived by A[i, 3]+A[i, 4]. Then, from Table 4, A[i, 3] and A[i, 4] are pre-stored with values A[5i+3] and A[5i+4], respectively. As another example, assume the i-th block of I is (01011). According to Table 5, the partial sum is A[i, 6]−A[i, 0] which, from Table 4, yields (A[5i]+A[5i+1]+A[5i+3]+A[5i+4])−A[5i]=A[5i+1]A[5i +3]+A[5i+4]. It can be seen that different covering codes lead to different look-up tables and hence different space-time tradeoffs.

PARTIAL SUMS ON MULTI-DIMENSIONAL DATA CUBE

The above-described one-dimensional partial-sum method is now generalized for a multi-dimensional case. Similar to the method for a one-dimensional case, the data cube is first partitioned into d-dimensional blocks, according to step 10 of FIG. 1. Note in this case that the indexes to the cells in the data cube are also multi-dimensional. Next, in accordance with step 12 of FIG. 1, one or more covering codes are selected for each block i. Assume that the covering codes are binary covering codes of fixed-length codewords. The flow chart of FIG. 8 then shows a preferred embodiment of step 16 of FIG. 1, for generating the partial-sum result, respectively, in the case of a d-dimensional data cube.

Starting with step 80, the d-dimensional indexes to the cells in each block i that intersects with the query subset I are represented as a product of d binary bit strings $V_z$'s, where each bit string $V_z$ corresponds to a data cube dimension, i.e., $1 \leq z \leq d$. In step 82, each covering code for the block i is augmented with all single-weight codewords, similar to the operation performed in step 32 of FIG. 3. For each dimension z of the data cube, where $1 \leq z \leq d$, a codeword $W_z$ of the augmented binary covering code is selected such that $W_z$ has the smallest Hamming distance to the respective bit string $V_z$, as shown by step 84. Next, in step 86, a second sum is computed for block i based on a combination of the codeword $W_z$ and a bit-position difference between $W_z$ and the bit string $V_z$. The codeword $W_z$ and bit strings $V_z$ are from all dimensions z of the data cube, where $1 \leq z \leq d$. Finally, in step 88, the second sums for all the blocks of the data cube that intersect with the subset I are combined (e.g., summed up) to arrive at the partial-sum result.

Figure 9:
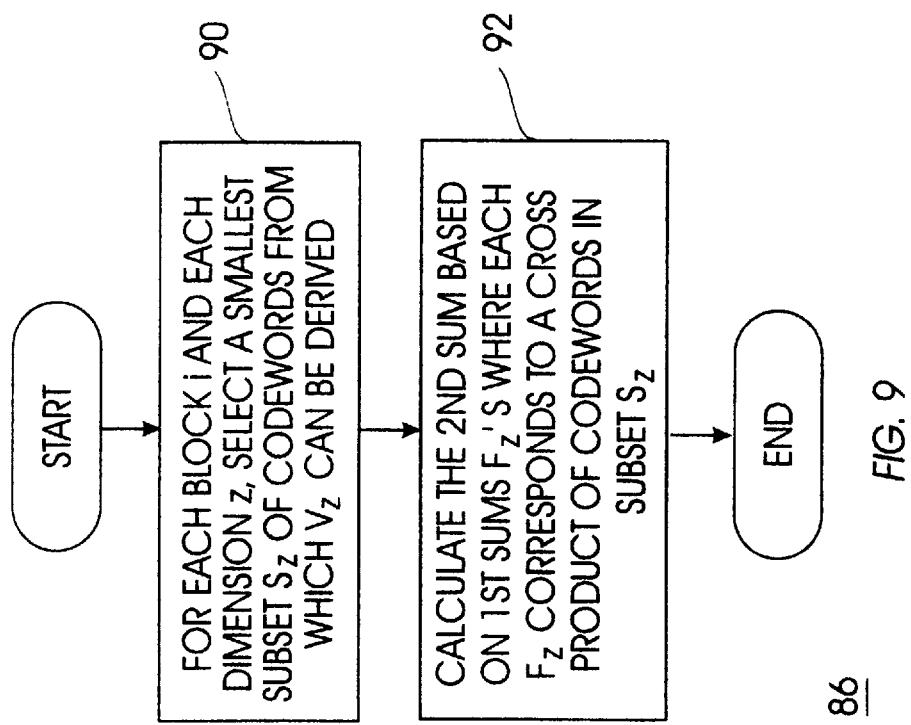

FIG. 9 shows further details of step 86, for computing a second sum for each block i that intersects with the query subset I. In step 90, for each block i and for each dimension z of the data cube, where $1 \leq z \leq d$, a smallest subset $S_z$ of codewords for the block i is selected such that the bit string $V_z$ can be derived from a combination of bit-wise additions and subtractions of the codewords of the subset $S_z$. Next, in step 92, the second sum for the block i (which intersects with the query subset I) is calculated based on the first sums $F_z$'s, where each sum $F_z$ corresponds to a cross-product of d codewords. Each of the d codewords is from the subset $S_z$ and corresponds to the respective dimension z of the data cube, for $1 \leq z \leq d$.

Figure 10:
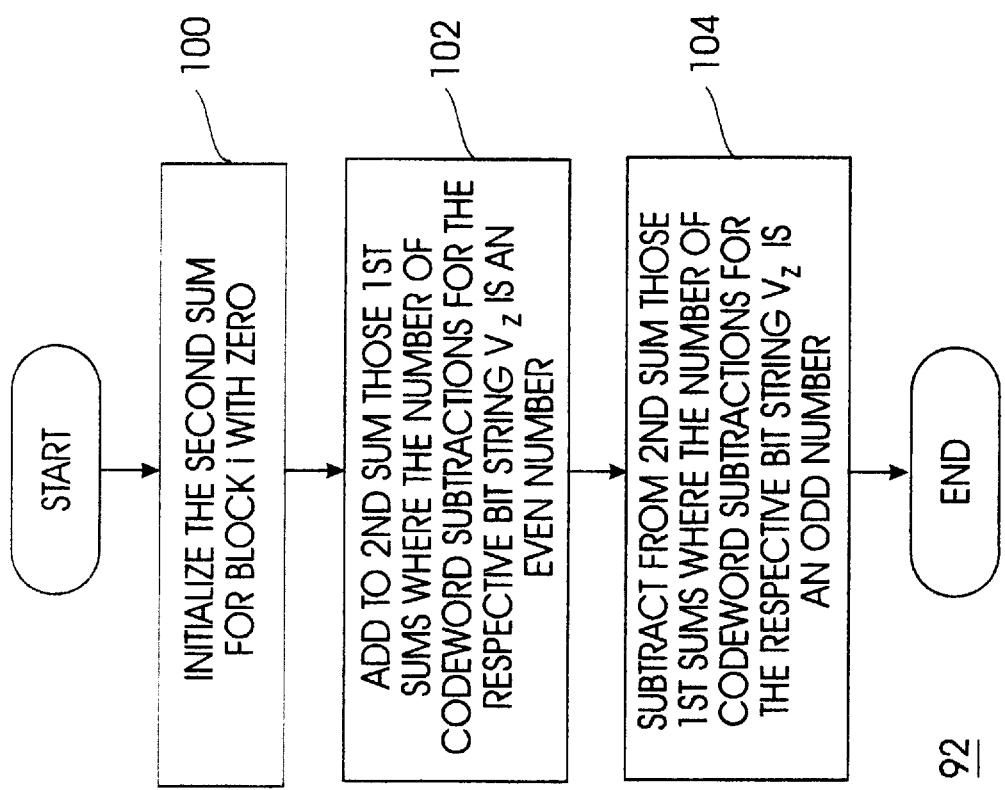
FIGS. 9 and 10 are flow charts showing further details of step 86 in FIG. 8, for computing a second sum for the block i, based on a codeword $W_z$ and a bit-position difference between $W_z$ and a bit string $V_z$ over all dimensions z, for $1 \leq z \leq d$.

The flow chart of FIG. 10 shows a preferred embodiment of step 92, for calculating the second sum using the first sums $F_z$'s. A variable representing the second sum is first initialized to zero in step 100. In step 102, a first group of first sums $F_z$'s for the block i (computed in step 14 of FIG. 1) is added to the second sum. These are the first sums whose computations were based the codewords where the number of bitwise codeword subtractions used to derive the respective bit string $V_z$ (step 90) is an even number. Also, a second group of first sums $F_z$'s for the block i is subtracted from the second sum, in step 104. These are the first sums whose computations were based the codewords where the number of bitwise codeword subtractions used to derive the respective bit string $V_z$ (step 90) is an odd number. The result from the addition and subtraction in steps 102 and 104 then becomes the final second sum for the respective block i.

Figure 8:
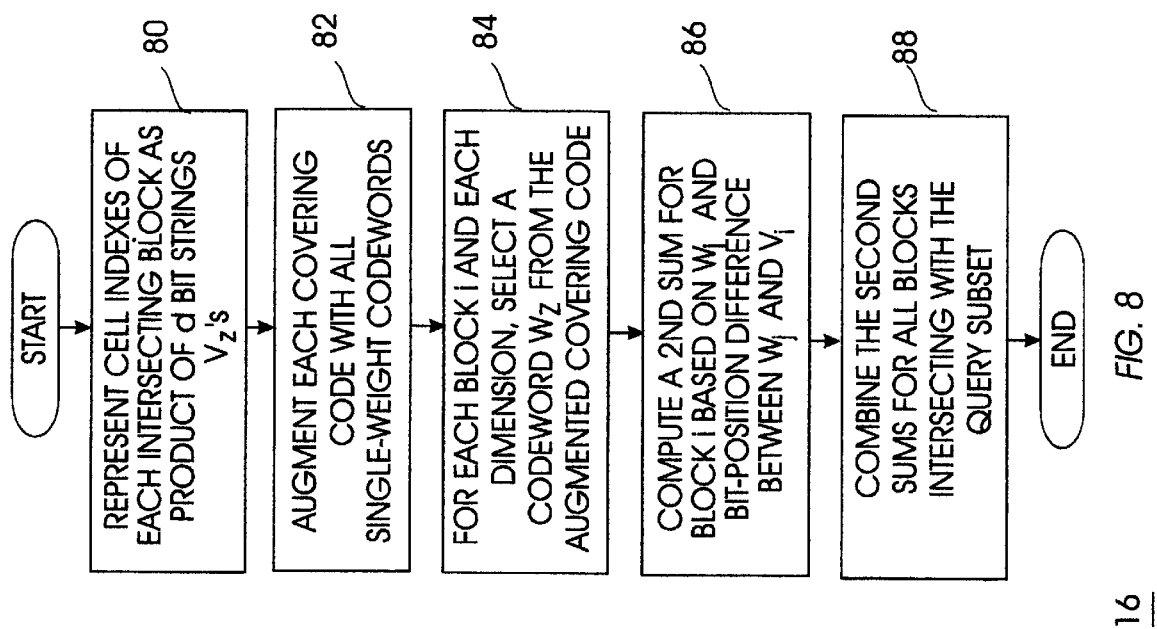
FIG. 8 is a flow chart showing further details of step 16 of FIG. 1, for generating the partial-sum query result, when the data cube is d-dimensional.

Formally, the steps represented by FIGS. 8–10 may be described as follows. Assume the data cube is a d-dimensional array A of form the $m_1$ x..x.$m_d$ and let $$m = \sum_{i=1}^{d} m_i$$

be the total size of A. Let M be the index domain of A and $D=\{1, \ldots, d\}$ be the set of dimensions. For each dimension $i \in D$, let $I_i$ denote an arbitrary subset of $\{0, \ldots, m_i-1\}$ specified by the user at query time. Also let $I=\{(x_1, \ldots, x_d) | (\forall i \in D)(x_i \in I_i)\}$. That is, $I=I_1 \times \ldots \times I_d$ and IAM. Given the array A in advance and the query subset I at query time, a partial sum of A of interest is specified by:

$$Psum(A, I) = \sum_{\forall (x_1, \ldots, x_d) \in I} A[x_1, \ldots, x_d] \qquad (7)$$

As an illustration, consider the case where A is a 2-dimensional array, i.e., d=2, such as one of the form 5×5, and assume that the (5, 7, 1)-covering code, which is also a (5, 9, 1)$^+$ single-weight-extended covering code, is applied to each dimension of A. The 9 codewords of this covering code (shown in Table 4) are denoted as $C_0$ through $C_8$. The index look-up table, denoted by X, is still the same as that for the one-dimensional case, as shown in Table 5. On the other hand, the partial-sum look-up table will be extended from Table 4 (which has 9 entries) to a two-dimensional table, denoted by P, of 9×9 entries. The entry P[i, j] of the look-up table contains the precomputed partial sum Psum(A, support($C_i$) x support($C_j$)).

For convenience, each entry of X is viewed as a set of (sign, index) pairs. Assume that $I_1=\{3, 4\}$ and $I_2=\{1, 3, 4\}$ are given at query time, and that mask($I_1$), which is (00011)=3, is used as an index to the index look-up table X to obtain X[mask($I_1$)]={(+1, 3), (+1, 4)}. Also, mask($I_2$), which is (01011)=11, is used as an index to the same index look-up table X to obtain X[mask(I$_2$)]={(+1, 6), (−1, 0)}. Psum(A, I) is then calculated as:

$$Psum(A, I) = \sum_{\forall (s_i, x_i) \in X[\text{mask}(I_i)]} \{(\Pi s_i) P[x_1, \ldots, x_d]\} \quad (8)$$

In this case Psum(A, I)=P[3, 6]+P[4, 6]−P[3, 0]−P[4, 0]. Intuitively, the final partial sum Psum(A, I) is derived from a combination of additions and subtractions of all relevant entries in P, where the relevant entries are the Cartesian products of different entries indexed by X[mask(I$_i$)]. Table 6 shows the

TABLE 6

| Index | Partial Sum |
|---|---|
| (3,6) | A[3,0] + A[3,1] + A[3,3] + A[3,4] |
| (4,6) | A[4,0] + A[4,1] + A[4,3] + A[4,4] |
| (3,0) | A[3,0] |
| (4,0) | A[4,0] | precomputed partial sums corresponding to the four terms on the right hand side of the Equation (8).

Figure 11:
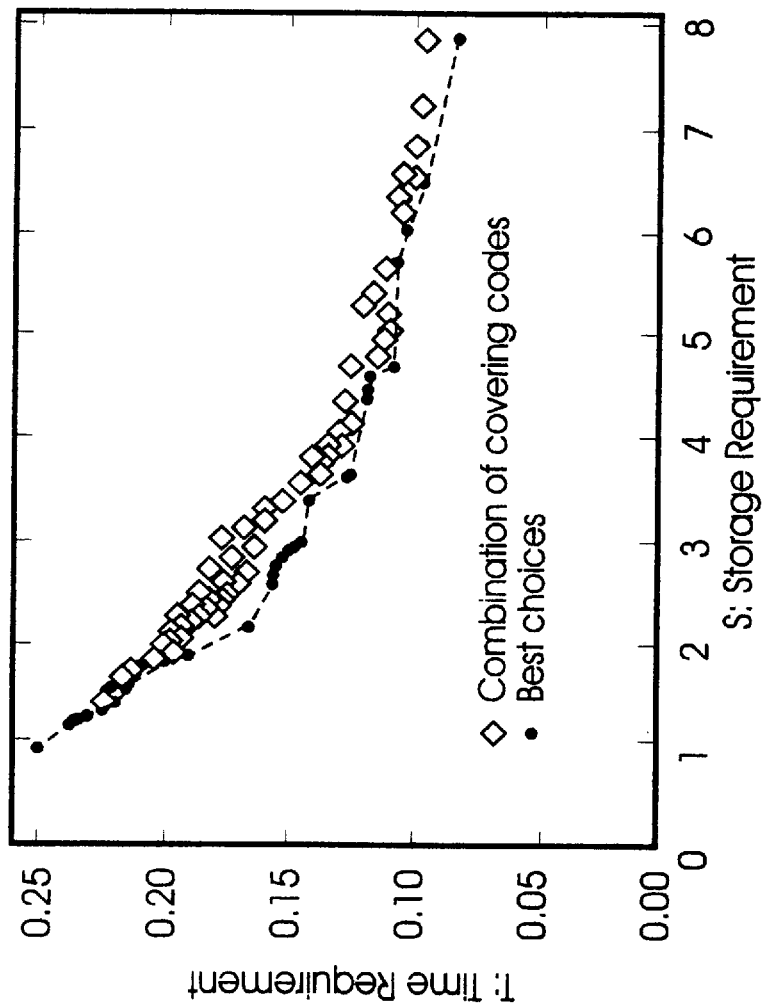
FIG. 11 represents a graph of the best (s, t)-pairs for two-dimensional partial-sums obtained using the method of the invention, with existing covering codes, new single-weight-extended covering codes, and new composition-extended covering codes.

The graph of FIG. 11 represents various (s, t) data points for computing a two-dimensional partial sum based on the combination of one-dimensional (s, t) data points from Table 3. As can be seen from FIG. 11, the best (s, t) data points are joined together by a curve. Note the leftmost (s, t) data point has been changed from (1, 0.5) in FIG. 7 to (1, 0.25) in FIG. 11.

Consider now the case where A is a d-dimensional array of form m$_1$ x . . . x m$_d$. In accordance with step 10 of FIG. 1, the array A is partitioned into d-dimensional blocks, each of form n$_1$ x . . . x n$_d$. The computation of the first sums of a block i is first described, and then its second sum. The first sums are typically computed at the OLAP installation time, while the second sum is usually done at query time because the query subset I is not known until that time. Assume here that the same covering code C is applied to all d dimensions and that C has K codewords. Consider a Cartesian product of d codewords, each chosen independently from C. There is a total of K$^d$ combinations of such Cartesian products. A first sum corresponding to each such Cartesian product will be generated. If a Cartesian product is W'$_1$ x . . . x W'$_d$, where W'$_x$ belongs to C, for $1 \leq x \leq d$, then the corresponding first sum is given by $\Sigma A[x_1, \ldots, x_d]$, $\forall x_j$ such that for all $1 \leq x \leq d$, the $x_j$-th bit of W'$_j$ is 1. For convenience, such a first sum is denoted as F(W'$_1$, . . . , W'$_d$).

To compute the second sum, first let I$^i$ denote the subset of query subset I that intersects with block i. Note that I$^i$ is a set of d-dimensional indexes which can be represented as a Cartesian product of d sets of one-dimensional indexes. Thus, I$^i$=I$_1$ x . . . x I$_d$. Also, let V$_x$=mask(I$_x$), for all $1 \leq x \leq d$. That is, V$_x$ is a binary bit-string (vector) of length n. The smallest subset of codewords S$_x$ is chosen for each dimension x, $1 \leq x \leq d$, so that there exists a combination of s$_x$ in {1, −1}, such that:

$$V_x = \sum_{\forall W_x \in S_x} s_x W_x \quad (9)$$

Then the second sum of block i is calculated according to Equation (10):

$$Psum(A, I^i) = Psum(A, I_1 \times \ldots \times I_d) = Psum(A, \text{support}(V_1) \times \ldots \times \text{support}(V_d)).$$

By substituting Equation (9) for all the bit strings V$_x$ for all x's, $1 \leq x \leq d$, in Equation (10), the block's second sum is obtained as follows:

$$Psum(A, I^i) = \Sigma \left\{ \left( \prod_{x=1}^{d} s_x \right) F(W'_1, \ldots, W'_d) \right\}, \quad (11)$$

$\forall W_x \in S_x, 1 \leq x \leq d.$

Based on the foregoing specification, the invention may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the invention. The computer readable media may be, for instance, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

An apparatus for making, using, or selling the invention may be one or more processing systems including, but not limited to, a central processing unit (CPU), memory, storage devices, communication links and devices, servers, I/O devices, or any sub-components of one or more processing systems, including software, firmware, hardware or any combination or subset thereof, which embody the invention as set forth in the claims.

User input may be received from the keyboard, mouse, pen, voice, touch screen, or any other means by which a human can input data to a computer, including through other programs such as application programs.

One skilled in the art of computer science will easily be able to combine the software created as described with appropriate general purpose or special purpose computer hardware to create a computer system or computer subsystem embodying the method of the invention.

While several preferred embodiments of the invention have been described, it should be apparent that modifications and adaptations to those embodiments may occur to persons skilled in the art without departing from the scope and the spirit of the present invention as set forth in the following claims.

What is claimed is:

1. A method for performing a partial-sum query in a database represented as a d-dimensional data cube, the data cube having a plurality of cells each having a value and identified by an index, the partial-sum query corresponding to a subset I of the data cube, the method comprising the steps of:

partitioning the data cube into a plurality of d-dimensional blocks;

selecting at least one covering code for each block i of the data cube, each covering code having a code length that is a function of the size of the block i;

computing a plurality of first sums for the block i, based on the respective covering codes selected for the block i; and generating a partial-sum result from the first sums corresponding to those blocks of the data cube that intersect with the subset I.

2. The method as recited in claim 1, wherein each dimension of the block i has a block length and corresponds to one of the covering codes selected for the block i.

3. The method as recited in claim 2, wherein the blocks of the data cube have the same block length in each dimension of the data cube.

4. The method as recited in claim 2, wherein the code length of each covering code for the block i is equal to a multiplication product of the respective block lengths of the block i in selected dimensions of the block i.

5. The method as recited in claim 1, wherein:

each of the covering codes for the block i includes a plurality of codewords; and each first sum of the block i is based on a Cartesian product of selected codewords, each selected codeword being from the covering code for a respective dimension of the block i.

6. The method as recited in claim 5, wherein:

each codeword of each covering code for the block i includes a sequence of bits;

the cells in the block i are indexed by the bits of the codewords of the covering codes for the block i; and each first sum of the block i includes a sum of the values of selected cells in the block i, where the bits indexing the selected cells, in the selected codewords, are all 1's.

7. The method as recited in claim 5, wherein:

each codeword in the covering codes has a codeword length;

the covering codes for the block i are binary covering codes; and the codewords of each binary covering code for the block i have the same codeword length.

8. The method as recited in claim 7, wherein:

the data cube is a one-dimensional array A; and the method further comprises the steps of:

representing the indexes to the cells in each block i that intersects with the subset I as a binary bit string $V_i$;

augmenting each binary covering code of the block i with all single-weight codewords, each single-weight codeword having a single "1" bit;

selecting a codeword $W_j$ from the augmented code such that $W_j$ has a smallest Hamming distance to the bit string $V_i$;

computing a second sum for the block i based on a first sum $F_j$ for the block i and a bit-position difference between $W_j$ and $V_i$, the first sum $F_j$ corresponding to the codeword $W_j$; and combining the second sums for all the blocks of the data cube that intersect with the subset I to generate the partial-sum result.

9. The method as recited in claim 8, wherein the step of computing a second sum includes the steps of:

initializing the second sum with the first sum $F_j$;

adding the value in cell A[x] to the second sum for all indexes x's such that the x-th bit of the bit string $V_i$ is "1" and the x-th bit of the codeword $W_j$ is "0"; and subtracting the value in cell A[y] from the second sum for all indexes y's such that the y-th bit of the bit string $V_i$ is "0" and the y-th bit of the codeword $W_j$ is "1".

10. The method as recited in claim 7, wherein:

the data cube is a one-dimensional array;

the indexes to the cells in each block i that intersects with the subset I are represented as a binary bit string $V_i$; and the method further comprises the steps of:

selecting a smallest subset S of codewords for the block i such that the bit string $V_i$ can be derived from a combination of bit-wise additions and bit-wise subtractions of the codewords in the subset S;

computing a second sum for the block i based on a plurality of first sums $F_j$'s, where each first sum $F_j$ corresponds to a codeword in the subset S; and combining the second sums for all blocks of the data cube that intersect with the subset I to generate the partial-sum result.

11. The method as recited in claim 10, wherein the step of computing a second sum for the block i includes the steps of:

initializing the second sum to zero;

adding to the second sum those first sums corresponding to the codewords of the subset S that were used in the bit-wise additions for deriving the bit string $V_i$; and subtracting from the second sum those first sums corresponding to the codewords of the subset S that were used in the bit-wise subtractions for deriving the bit string $V_i$.

12. The method as recited in claim 7, wherein:

the data cube and the cell indexes are d-dimensional, where d>1;

the d-dimensional indexes to the cells in each block i that intersects with the subset I are represented as a product of d binary bit strings $V_z$'s, where each bit string $V_z$ corresponds to a data cube dimension z, for $1 \leq z \leq d$; and the method further comprises the steps of:

augmenting each binary covering code of the block i with all single-weight codewords, each single-weight codeword having a single "1" bit;

for each block i and for each dimension z of the data cube, where $1 \leq z \leq d$, selecting a codeword $W_z$ from the augmented code such that $W_z$ has a smallest Hamming distance to the bit string $V_z$;

computing a second sum for the block i based on a combination of the codeword $W_z$ and a bit-position difference between $W_z$ and $V_z$ over all dimensions z, for $1 \leq z \leq d$; and combining the second sums for all blocks of the data cube that intersect with the subset I to generate the partial-sum result.

13. The method as recited in claim 12, wherein the step of computing a second sum includes the steps of:

for each block i and for each dimension z of the data cube, where $1 \leq z \leq d$, selecting a smallest subset $S_z$ of the codewords for the block i such that each bit string $V_z$ can be derived from a combination of bit-wise additions and bit-wise subtractions of the codewords in $S_z$; and calculating the second sum for the block i based on a plurality of first sums $F_z$'s, each first sum $F_z$ corresponding to a cross-product of d codewords each being from the subset $S_z$ for the respective dimension z, where $1 \leq z \leq d$.

14. The method as recited in claim 13, wherein the step of calculating the second sum includes the steps of:

initializing the second sum to zero;

adding to the second sum those first sums $F_z$'s for the block i where the number of bit-wise codeword subtractions used to derive the respective bit string $V_z$ is an even number; and subtracting from the second sum those first sums $F_z$'s for the block i where the number of bit-wise codeword subtractions used to derive the respective bit string $V_z$ is an odd number.

15. A computer program product for use with a computer system for performing a partial-sum query in a database, the database being represented as a d-dimensional data cube having a plurality of cells, each cell having a value and identified by an index, the partial-sum query corresponding to a subset I of the data cube, the computer program product comprising:

a computer-readable medium;

means, provided on the computer-readable medium, for directing the system to partition the data cube into a plurality of d-dimensional blocks;

means, provided on the computer-readable medium, for directing the system to select at least one covering code for each block i of the data cube, each covering code having a code length that is a function of the size of the block i;

means, provided on the computer-readable medium, for directing the system to compute a plurality of first sums for the block i, based on the respective covering codes selected for the block i; and means, provided on the computer-readable medium, for directing the system to generate a partial-sum result from the first sums corresponding to those blocks of the data cube that intersect with the subset I.

16. The computer program product as recited in claim 15, wherein each dimension of the block i has a block length and corresponds to one of the covering codes selected for the block i.

17. The computer program product as recited in claim 16, wherein the blocks of the data cube have the same block length in each dimension of the data cube.

18. The computer program product as recited in claim 16, wherein the code length of each covering code for the block i is equal to a multiplication product of the respective block lengths of the block i in selected dimensions of the block i.

19. The computer program product as recited in claim 15, wherein:

each of the covering codes for the block i includes a plurality of codewords; and each first sum of the block i is based on a Cartesian product of selected codewords, each selected codeword being from the covering code for a respective dimension of the block i.

20. The computer program product as recited in claim 19, wherein:

each codeword of each covering code for the block i includes a sequence of bits;

the cells in the block i are indexed by the bits of the codewords of the covering codes for the block i; and each first sum of the block i includes a sum of the values of selected cells in the block i, where the bits indexing the selected cells, in the selected codewords, are all 1's.

21. The computer program product as recited in claim 19, wherein:

each codeword in the covering codes has a codeword length;

the covering codes for the block i are binary covering codes; and the codewords of each binary covering code for the block i have the same codeword length.

22. The computer program product as recited in claim 21, wherein:

the data cube is a one-dimensional array A;

the indexes to the cells in each block i that intersects with the subset I are represented as a binary bit string $V_i$; and the computer program product further comprises:

means, provided on the computer-readable medium, for directing the system to augment each binary covering code of the block i with all single-weight codewords, each single-weight codeword having a single "1" bit;

means, provided on the computer-readable medium, for directing the system to select a codeword $W_j$ from the augmented code such that $W_j$ has a smallest Hamming distance to the bit string $V_i$;

means, provided on the computer-readable medium, for directing the system to compute a second sum for the block i based on a first sum $F_j$ for the block i and a bit-position difference between $W_j$ and $V_i$, the first sum $F_j$ corresponding to the codeword $W_j$; and means, provided on the computer-readable medium, for directing the system to combine the second sums for all the blocks of the data cube that intersect with the subset I to generate the partial-sum result.

23. The computer program product as recited in claim 22, wherein the means for directing to compute a second sum includes:

means, provided on the computer-readable medium, for directing the system to initialize the second sum with the first sum $F_j$;

means, provided on the computer-readable medium, for directing the system to add the value in cell A[x] to the second sum for all indexes x's such that the x-th bit of the bit string $V_i$ is "1" and the x-th bit of the codeword $W_j$ is "0"; and means, provided on the computer-readable medium, for directing the system to subtract the value in cell A[y] from the second sum for all indexes y's such that the y-th bit of the bit string $V_i$ is "0" and the y-th bit of the codeword $W_j$ is "1".

24. The computer program product as recited in claim 21, wherein:

the data cube is a one-dimensional array;

the indexes to the cells in each block i that intersects with the subset I are represented as a binary bit string $V_i$; and the computer program product further comprises:

means, provided on the computer-readable medium, for directing the system to select a smallest subset S of the codewords for the block i such that the bit string $V_i$ can be derived from a combination of bit-wise additions and bit-wise subtractions of the codewords in the subset S;

means, provided on the computer-readable medium, for directing the system to compute a second sum for the block i based on a plurality of first sums $F_j$'s where each first sum $F_j$ corresponds to a codeword in the subset S; and means, provided on the computer-readable medium, for directing the system to combine the second sums for all blocks of the data cube that intersect with the subset I to generate the partial-sum result.

25. The computer program product as recited in claim 24, wherein the means for directing to compute a second sum for the block i includes:

means, provided on the computer-readable medium, for directing the system to initialize the second sum to zero;

means, provided on the computer-readable medium, for directing the system to add to the second sum those first sums corresponding to the codewords of the subset S that were used in the bit-wise additions for deriving the bit string $V_j$; and means, provided on the computer-readable medium, for directing the system to subtract from the second sum those first sums corresponding to the codewords of the subset S that were used in the bit-wise subtractions for deriving the bit string $V_j$.

26. The computer program product as recited in claim 21, wherein:

the data cube and the cell indexes are d-dimensional, where d>1;

the d-dimensional indexes to the cells in each block i that intersects with the subset I are represented as a product of d binary bit strings $V_z$'s, where each bit string $V_z$ corresponds to a data cube dimension z, for $1 \leq z \leq d$; and the computer program product further comprises:

means, provided on the computer-readable medium, for directing the system to augment each binary covering code of the block i with all single-weight codewords, each single-weight codeword having a single "1" bit;

means, provided on the computer-readable medium, for directing the system to select, for each block i and for each dimension z of the data cube where $1 \leq z \leq d$, a codeword $W_z$ from the augmented code such that $W_z$ has a smallest Hamming distance to the bit string $V_z$;

means, provided on the computer-readable medium, for directing the system to compute a second sum for the block i based on a combination of the codeword $W_z$ and a bit-position difference between $W_z$ and $V_z$ over all dimensions z, for $1 \leq z \leq d$; and means, provided on the computer-readable medium, for directing the system to combine the second sums for all blocks of the data cube that intersect with the subset I to generate the partial-sum result.

27. The computer program product as recited in claim 26, wherein the means for directing to compute a second sum includes:

means, provided on the computer-readable medium, for directing the system to select, for each block i and for each dimension z of the data cube where $1 \leq z \leq d$, a smallest subset $S_z$ of the codewords for the block i such that each bit string $V_z$ can be derived from a combination of bit-wise additions and bit-wise subtractions of the codewords in $S_z$; and means, provided on the computer-readable medium, for directing the system to calculate the second sum for the block i based on a plurality of first sums $F_z$'s, each first sum $F_z$ corresponding to a cross-product of d codewords each being from the subset $S_z$ for the respective dimension z, where $1 \leq z \leq d$.

28. The computer program product as recited in claim 27, wherein the means for directing to calculate the second sum includes:

means, provided on the computer-readable medium, for directing the system to initialize the second sum to zero;

means, provided on the computer-readable medium, for directing the system to add to the second sum those first sums $F_z$'s for the block i where the number of bit-wise codeword subtractions used to derive the respective bit string $V_z$ is an even number; and means, provided on the computer-readable medium, for directing the system to subtract from the second sum those first sums $F_z$'s for the block i where the number of bit-wise codeword subtractions used to derive the respective bit string $V_z$ is an odd number.

29. A system for performing a partial-sum query in a database represented as a d-dimensional data cube, the data cube having a plurality of cells each having a value and identified by an index, the partial-sum query corresponding to a subset I of the data cube, the system comprising:

means for partitioning the data cube into a plurality of d-dimensional blocks;

means for selecting at least one covering code for each block i of the data cube, each covering code having a code length that is a function of the size of the block i;

means for computing a plurality of first sums for the block i, based on the respective covering codes selected for the block i; and means for generating a partial-sum result from the first sums corresponding to those blocks of the data cube that intersect with the subset I.

30. The system as recited in claim 29, wherein each dimension of the block i has a block length and corresponds to one of the covering codes selected for the block i.

31. The system as recited in claim 30, wherein the blocks of the data cube have the same block length in each dimension of the data cube.

32. The system as recited in claim 30, wherein the code length of each covering code for the block i is equal to a multiplication product of the respective block lengths of the block i in selected dimensions of the block i.

33. The system as recited in claim 29, wherein:

each of the covering codes for the block i includes a plurality of codewords; and each first sum of the block i is based on a Cartesian product of selected codewords, each selected codeword being from the covering code for a respective dimension of the block i.

34. The system as recited in claim 33, wherein:

each codeword of each covering code for the block i includes a sequence of bits;

the cells in the block i are indexed by the bits of the codewords of the covering codes for the block i; and each first sum of the block i includes a sum of the values of selected cells in the block i, where the bits indexing the selected cells, in the selected codewords, are all 1's.

35. The system as recited in claim 33, wherein:

each codeword in the covering codes has a codeword length;

the covering codes for the block i are binary covering codes; and the codewords of each binary covering code for the block i have the same codeword length.

36. The system as recited in claim 35, wherein:

the data cube is a one-dimensional array A; and the system further comprises:

means for representing the indexes to the cells in each block i that intersects with the subset I as a binary bit string $V_j$;

means for augmenting each binary covering code of the block i with all single-weight codewords, each single-weight codeword having a single "1" bit;

means for selecting a codeword $W_j$ from the augmented code such that $W_j$ has a smallest Hamming distance to the bit string $V_j$;

means for computing a second sum for the block i based on a first sum $F_j$ for the block i and a bit-position difference between $W_j$ and $V_i$, the first sum $F_j$ corresponding to the codeword $W_j$; and means for combining the second sums for all the blocks of the data cube that intersect with the subset I to generate the partial-sum result.

37. The system as recited in claim 36, wherein the means for computing a second sum includes:

means for initializing the second sum with the first sum $F_j$;

means for adding the value in cell A[x] to the second sum for all indexes x's such that the x-th bit of the bit string $V_i$ is "1" and the x-th bit of the codeword $W_j$ is "0"; and means for subtracting the value in cell A[y] from the second sum for all indexes y's such that the y-th bit of the bit string $V_i$ is "0" and the y-th bit of the codeword $W_j$ is "1".

38. The system as recited in claim 35, wherein:

the data cube is a one-dimensional array;

the indexes to the cells in each block i that intersects with the subset I are represented as a binary bit string $V_i$; and the system further comprises:

means for selecting a smallest subset S of codewords for the block i such that the bit string $V_i$ can be derived from a combination of bit-wise additions and bit-wise subtractions of the codewords in the subset S;

means for computing a second sum for the block i based on a plurality of first sums $F_j$'s, where each first sum $F_j$ corresponds to a codeword in the subset S; and means for combining the second sums for all blocks of the data cube that intersect with the subset I to generate the partial-sum result.

39. The system as recited in claim 38, wherein the means for computing a second sum for the block i includes:

means for initializing the second sum to zero;

means for adding to the second sum those first sums corresponding to the codewords of the subset S that were used in the bit-wise additions for deriving the bit string $V_i$; and means for subtracting from the second sum those first sums corresponding to the codewords of the subset S that were used in the bit-wise subtractions for deriving the bit string $V_i$.

40. The system as recited in claim 35, wherein:

the data cube and the cell indexes are d-dimensional, where d>1;

the d-dimensional indexes to the cells in each block i that intersects with the subset I are represented as a product of d binary bit strings $V_z$'s, where each bit string $V_z$ corresponds to a data cube dimension z, for $1 \leq z \leq d$; and the system further comprises:

means for augmenting each binary covering code of the block i with all single-weight codewords, each single-weight codewords having a single "1" bit;

means for selecting, for each block i and for each dimension z of the data cube, where $1 \leq z \leq d$, a codeword $W_z$ from the augmented code such that $W_z$ has a smallest Hamming distance to the bit string $V_z$;

means for computing a second sum for the block i based on a combination of the codeword $W_z$ and a bit-position difference between $W_z$ and $V_z$ over all dimensions z, for $1 \leq z \leq d$; and is means for combining the second sums for all blocks of the data cube that intersect with the subset I to generate the partial-sum result.

41. The system as recited in claim 40, wherein the means for computing a second sum includes:

means for selecting, for each block i and for each dimension z of the data cube, where $1 \leq z \leq d$, a smallest subset $S_z$ of the codewords for the block i such that each bit string $V_z$ can be derived from a combination of bit-wise additions and bit-wise subtractions of the codewords in $S_z$; and means for calculating the second sum for the block i based on a plurality of first sums $F_z$'s, each first sum $F_z$ corresponding to a cross-product of d codewords each being from the subset $S_z$ for the respective dimension z, where $1 \leq z \leq d$.

42. The system as recited in claim 41, wherein the means for calculating the second sum includes:

means for initializing the second sum to zero;

means for adding to the second sum those first sums $F_z$'s for the block i where the number of bit-wise codeword subtractions used to derive the respective bit string $V_z$ is an even number; and means for subtracting from the second sum those first sums $F_z$'s for the block i where the number of bit-wise codeword subtractions used to derive the respective bit string $V_z$ is an odd number.

* * * * *